April 10, 1934.
C. J. LEMONT
1,954,675
RACK CONSTRUCTION
Filed May 29, 1929
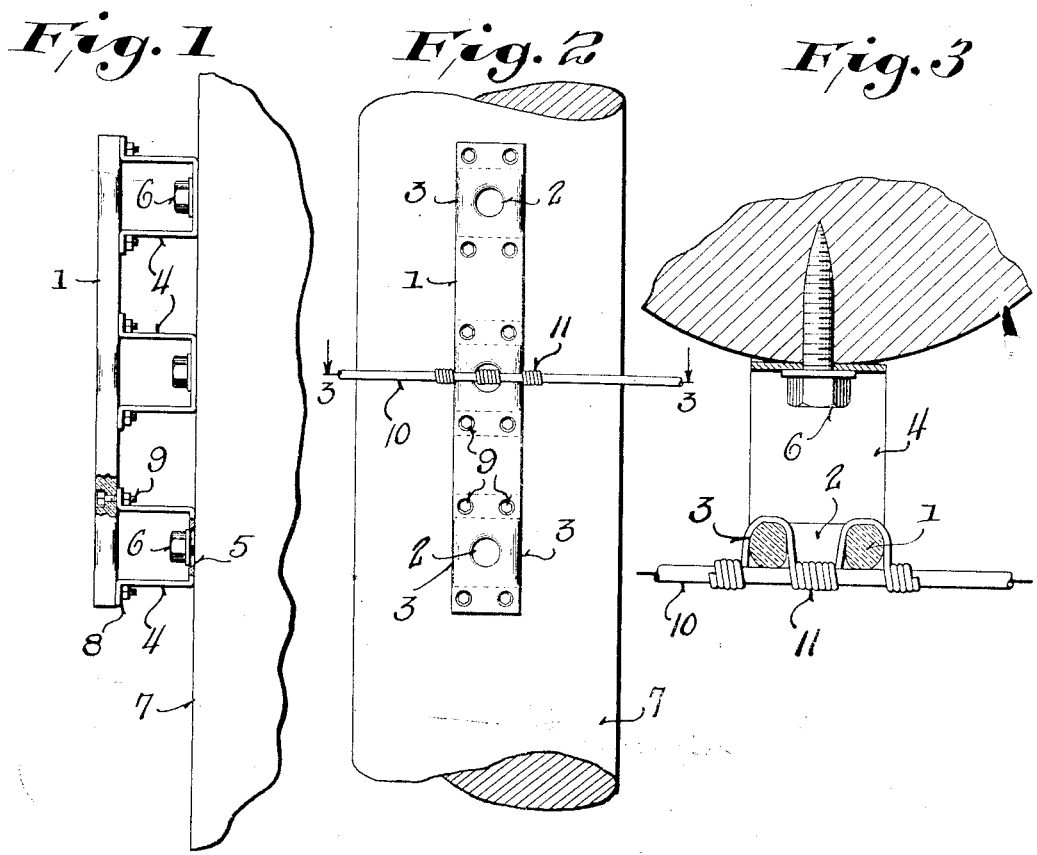
Inventor
Clarence J. Lemont
By Arthur R. Woolfolk
Attorney Patented Apr. 10, 1934

1,954,675

UNITED STATES PATENT OFFICE 1,954,675

RACK CONSTRUCTION

Clarence J. Lemont, South Milwaukee, Wis., assignor to Line Material Company, a corporation of Delaware Application May 29, 1929, Serial No. 366,920

2 Claims. (Cl. 173—321)

This invention relates to a rack construction, and although it is applicable to a number of different uses, it is particularly applicable for use as a secondary rack.

In secondary racks, as heretofore constructed, difficulty has been experienced due to the fact that the insulators were brittle and were easily broken when, for instance, the rack was dropped or subjected to other severe uses, and also due to the fact that the racks frequently had several detachable parts which were easy to misplace and which were therefore sometimes lost. In addition to this, the several parts of the former rack constructions necessitated a rather extensive assembling operation and thus increased the cost of the rack.

This invention is designed to overcome the defects noted above, and objects of such inventions are to provide a novel form of rack construction in which all of the parts are rigid and firm, and so organized or related that the rack may be easily attached to a pole or other support.

Further objects are to provide a simple and inexpensive rack construction which will stand a large amount of severe abuse and in which the insulating portion is non-brittle and cannot be cracked by an ordinary blow, to which the device is frequently subjected, particularly during the operation of securing the rack to a support.

Further objects are to provide a rack construction which takes up a small amount of room on a pole or other support, which permits of a limited adjustment to secure the correct alignment of the wires, and which is so made that the wires may be most easily attached to the rack and will secure a very firm hold, or tying action.

Further objects are to provide a rack construction which has good insulating characteristics and in which the insulating portion is secured at a plurality of points.

An embodiment of the invention is shown in the accompanying drawing, in which:—

Figure 1 is a side elevation, partly in section, of one form of rack, showing it attached to a pole.

Figure 2 is a face view of the construction shown in Figure 1.

Figure 3 is a transverse sectional detail drawn on a large scale, and taken on a line 3—3 of Figure 2.

Referring to Figures 1, 2 and 3, it will be seen that the rack comprises an insulating bar or member 1 which is elongated and which is provided with a plurality of regularly spaced holes 2. Preferably the edges of these holes are rounded and the adjacent marginal edges of the bar are similarly rounded, as indicated at 3 in Figure 2. This construction also is very clearly shown in the large transverse sectional view illustrated in Figure 3.

The bar is formed of any suitable weather-resisting insulating material, such, for example, as a phenol composition or a fibrous composition or other suitable insulated material. It is preferable to use an insulating material which is non-brittle, although the invention in its broadest aspects is not limited to this feature.

The insulating bar or member is carried by means of a plurality of U-shaped metal spacing supports 4, (see Figure 1) which are of approximately the same width as the bar 1. Each of the supports or spacing members is provided with an elongated slot 5 in its central portion through which the stem of a lag screw or bolt 6 may be passed to thus secure the spacing members to a suitable support, such as the pole 7. These elongated slots provide for a limited vertical adjustment of the rack to secure proper alignment of the wires.

The supports or spacing members 4 are provided with outwardly turned outer feet 8. These feet are secured by means of bolts or other suitable attaching means 9 to the insulating bar 1. Preferably the heads of the bolts are countersunk or inset below the outer face of the insulating bar 1.

The construction thus provides a smooth outer face for the rack, so that the wires, for instance, as indicated at 10, will not be abraded or otherwise injured by catching against sharp projections as has frequently been the case heretofore.

The wires 10 may be attached to the insulating member 1 in any suitable manner, as by means of the tie wires 11. These tie wires may be secured to the main wires 10 in any suitable manner, for example, as shown in Figures 2 and 3. It is obvious that other means could be employed for attaching the main wires to the insulating bars or elongated insulating member 1. At all events, it is apparent that no damage can be occasioned the wires 10, as they are bound tightly against a smooth insulating member. There is no tendency for cutting of the tie wires to occur in this construction, as is obvious from an inspection of Figure 3.

An additional advantage which is secured by this invention lies in the fact that the parts of the insulating rack are rigid and cannot relatively move. Thus, when the wires 10 are pulled up tight in the usual practice of stringing the wires and are attached to the insulating strip or bar, there is no chance for the bar to move or turn, as has frequently been the case with the previous forms of secondary racks. Thus there is no chance of excessive bending or sharp bending of the main wires or of the tie wires.

It will be seen that a very simple and serviceable form of rack constructions has been provided by this invention, which may be readily attached to a pole or other support, and which provides good insulating characteristics as well as unusual mechanical strength.

Further it will be seen that the construction is very simple and may be cheaply produced.

Although this invention has been described in considerable detail, it is to be understood that such description is intended as illustrative rather than limiting, as the invention may be variously embodied and is to be interpreted as claimed.

I claim:

1. A rack support comprising an elongated bar of insulating material having apertures therethrough adapted to receive wires, a plurality of U-shaped metal members having transverse rear portions adapted to contact with a pole and provided with apertures through which attaching screws may be passed, each of said U-shaped members having spaced, forwardly directed arms provided with laterally turned feet contacting with the rear face of said insulating bar and arranged in spaced relation to the apertures through said bar, said U-shaped members being spaced longitudinally of said bar, and fastening means securing said bar to said feet, said transverse rear portions being spaced from said bar to allow manipulation of said attaching screws, the apertures in said bar and the apertures in said transverse rear portions being in alignment.

2. A rack support comprising an elongated bar of insulating material having apertures therethrough, said bar being adapted to receive wires in contact with its outer face and said apertures being adapted to receive tie wires to secure said first mentioned wires, a plurality of U-shaped metal members having transverse rear portions adapted to contact with a pole and provided with apertures through which attaching screws may be passed, each of said U-shaped members having spaced, forwardly directed arms provided with laterally turned feet rigidly secured to the inner face of said bar, said U-shaped members being spaced apart to provide spaced attachment to the pole, the transverse rear faces and the laterally turned feet providing a multiple bracing effect to prevent rocking of said bar with reference to said pole.

CLARENCE J. LEMONT.